United States Patent
Gasworth

(10) Patent No.: US 11,209,580 B2
(45) Date of Patent: Dec. 28, 2021

(54) ARTICLES COMPRISING AN INFRARED BLOCKING LAYER AND METHODS OF MAKING THE SAME

(71) Applicant: SABIC GLOBAL TECHNOLOGIES B.V., Bergen op Zoom (NL)

(72) Inventor: Steven Marc Gasworth, Wixom, MI (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 409 days.

(21) Appl. No.: 16/467,583

(22) PCT Filed: Dec. 20, 2017

(86) PCT No.: PCT/US2017/067558
§ 371 (c)(1),
(2) Date: Jun. 7, 2019

(87) PCT Pub. No.: WO2018/119054
PCT Pub. Date: Jun. 28, 2018

(65) Prior Publication Data
US 2020/0003938 A1    Jan. 2, 2020

Related U.S. Application Data

(60) Provisional application No. 62/438,544, filed on Dec. 23, 2016.

(51) Int. Cl.
*G02B 5/26* (2006.01)
*G02B 5/20* (2006.01)
(Continued)

(52) U.S. Cl.
CPC ............. *G02B 5/208* (2013.01); *B32B 27/00* (2013.01); *C03C 17/32* (2013.01); *G02B 1/005* (2013.01); *G02B 5/282* (2013.01)

(58) Field of Classification Search
CPC ............. B32B 27/00; B32B 2250/40; B32B 2605/006; B32B 27/08; B32B 27/28;
(Continued)

(56) References Cited

U.S. PATENT DOCUMENTS

| | | | |
|---|---|---|---|
| 3,711,176 A | 1/1973 | Alfrey, Jr. et al. | |
| 4,579,638 A | 4/1986 | Scherber | |

(Continued)

FOREIGN PATENT DOCUMENTS

| | | |
|---|---|---|
| WO | 2010017648 A1 | 2/2010 |
| WO | 2015017984 A1 | 2/2015 |
| WO | 2015106277 A1 | 7/2015 |

OTHER PUBLICATIONS

Hart et al., "External Reflection from Omnidirectional Dielectric Mirror Fibers," SCIENCE, Apr. 19, 2002, pp. 510-513, vol. 296.
(Continued)

*Primary Examiner* — Balram T Parbadia
(74) *Attorney, Agent, or Firm* — Cantor Colburn LLP

(57) ABSTRACT

In an embodiment, an article comprises an infrared blocking layer comprising a host material (18) and a plurality of composite fibers (20); wherein each of the composite fibers of the plurality of composite fibers comprises a contrast material and a matrix material; wherein the contrast material forms a photonic crystal in the matrix material that when exposed to an infrared radiation manifests a photonic band gap. In another embodiment, a method of making an article comprises mixing a host material or a host polymer precursor and a plurality of composite fibers to form a mixture; and forming an infrared blocking layer from the mixture. In another embodiment, a method of making an article comprises one or both of forming a layered stack and co-extruding a host layer, a fiber layer, and an optional polymer layer.

19 Claims, 3 Drawing Sheets

(51) Int. Cl.
*B32B 27/00* (2006.01)
*C03C 17/32* (2006.01)
*G02B 1/00* (2006.01)
*G02B 5/28* (2006.01)

(58) Field of Classification Search
CPC ... B32B 27/286; B32B 27/288; B32B 27/302; B32B 27/304; B32B 27/308; B32B 27/322; B32B 27/36; B32B 27/365; B32B 5/04; B32B 2307/732; B32B 27/12; B32B 2260/021; B32B 2260/046; B32B 2307/40; C03C 17/32; G02B 5/208; G02B 1/00; G02B 5/20; G02B 5/28; G02B 5/26; G02B 1/005; G02B 5/206; G02B 5/282
See application file for complete search history.

(56) References Cited

U.S. PATENT DOCUMENTS

| | | | |
|---|---|---|---|
| 4,822,120 A | 4/1989 | Fan et al. | |
| 6,261,694 B1 | 7/2001 | Iacovangelo | |
| 6,623,556 B2 | 9/2003 | Zama et al. | |
| 6,635,342 B1 | 10/2003 | Ben-Zvi et al. | |
| 6,800,337 B1 | 10/2004 | Siemensmeyer et al. | |
| 7,252,785 B2 | 8/2007 | Parker et al. | |
| 7,311,962 B2 | 12/2007 | Fink et al. | |
| 7,386,212 B2 | 6/2008 | Ouderkirk et al. | |
| 7,727,418 B2 | 6/2010 | Momose et al. | |
| 7,728,056 B2 | 6/2010 | Kuvshinnikova et al. | |
| 7,952,805 B2 | 5/2011 | McGurran et al. | |
| 8,968,610 B2 | 3/2015 | Meyer et al. | |
| 9,057,835 B2 | 6/2015 | Hellring et al. | |
| 9,713,254 B2 | 7/2017 | Young et al. | |
| 9,977,180 B2 | 5/2018 | Bernd et al. | |
| 2008/0103267 A1 | 5/2008 | Hurst et al. | |
| 2013/0323481 A1 | 12/2013 | Gasworth | |
| 2015/0168619 A1 | 6/2015 | Ohmoto et al. | |
| 2015/0321456 A1 | 11/2015 | Gasworth | |
| 2015/0343752 A1 | 12/2015 | Gasworth | |
| 2016/0011338 A1 | 1/2016 | Li et al. | |
| 2016/0060485 A1 | 3/2016 | Zheng et al. | |
| 2017/0003424 A1* | 1/2017 | Rahman | B32B 37/14 |

OTHER PUBLICATIONS

International Search Report; International Application No. PCT/US2017/067558; International Filing Date: Dec. 20, 2017; dated Apr. 9, 2018; 6 pages.

Written Opinion; International Application No. PCT/US2017/067558; International Filing Date: Dec. 20, 2017 dated Apr. 9, 2018; 7 pages.

* cited by examiner

ARTICLES COMPRISING AN INFRARED BLOCKING LAYER AND METHODS OF MAKING THE SAME

CROSS-REFERENCE TO TECHNICALLY RELATED APPLICATION

This application is a National Stage application of PCT/US2017/067558, filed Dec. 20, 2017, which claims the benefit of U.S. Provisional Patent Application Ser. No. 62/438,544 filed Dec. 23, 2016. The related application is incorporated herein in its entirety by reference.

BACKGROUND

Plastic glazings offer many advantages as compared to conventional glass glazings. These advantages include, for example, increased fracture resistance, a reduced weight, and, for use in vehicles, an increased occupant safety in the event of traffic accidents as well as a reduced fuel consumption. Unfortunately though, due to the present methods of infrared blocking in glazing technology, interior spaces, such as those of buildings and vehicles, experience an increased rise in temperature in the presence of a plastic glazing as compared to a glass glazing comprising an infrared reflecting layer. This increase in temperature of interior spaces arises due the presence of infrared absorbers that are added to plastic glazings to prevent infrared radiation from passing through the plastic glazing. Here, while the infrared absorbers absorb infrared radiation, a secondary radiation arises that can enter into the interior space to result in the increase in temperature. The increased temperature in the interior space reduces the comfort for the occupants or inhabitants and may entail increased demands on the air conditioning, which in turn increases the energy consumption. Further, due to the infrared absorbance, the plastic glazing itself can experience an increase in temperature, which can accelerate the degradation of the plastic glazing.

Thus, there is a need for new technologies, for example, with passive design solutions, which would lead to a reduced solar heat load in interior spaces.

BRIEF SUMMARY

Disclosed herein is an article comprising an infrared blocking layer and methods of making the same.

In an embodiment, an article comprises an infrared blocking layer comprising a host material and a plurality of composite fibers; wherein each of the composite fibers of the plurality of composite fibers comprises a contrast material and a matrix material; wherein the contrast material forms a photonic crystal in the matrix material that when exposed to an infrared radiation manifests a photonic band gap.

In another embodiment, a method of making an article comprises mixing a host material and a plurality of composite fibers to form a mixture; and forming an infrared blocking layer from the mixture; wherein the article comprises the infrared blocking layer.

In another embodiment, a method of making an article comprises mixing a host polymer precursor and a plurality of composite fibers to form a mixture; and reacting the host polymer precursor to form the infrared blocking layer; wherein the article comprises the infrared blocking layer.

In yet another embodiment, a method of making an article comprises forming a layered stack comprising a host layer that is free of a plurality of composite fibers, a fiber layer comprising a plurality of composite fibers, and an optional polymer layer that is free of a plurality of composite fibers; and embedding the plurality of composite fibers in at least one of the host layer and the optional polymer layer.

In a further embodiment, a method of making an article comprises co-extruding a host layer that is free of composite fibers, a fiber layer comprising a plurality of composite fibers, and an optional polymer layer that is free of composite fibers; wherein the composite fibers are pre-formed fibers; and embedding the plurality of composite fibers in at least one of the host layer and the optional polymer layer.

In still another embodiment, use of an article for reflecting infrared light; wherein the article comprises an infrared blocking layer comprising a host material and a plurality of composite fibers; wherein each of the fibers of the plurality of composite fibers comprises a contrast material and a matrix material; wherein the contrast material forms a photonic crystal in the matrix material that, when exposed to an infrared radiation, manifests a photonic band gap.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

The greatest part of solar energy is apportioned to both the visible and near infrared wavelengths of 400 to 2,500 nanometers (nm). Solar radiation that penetrates a plastic glazing and enters an internal space can be re-emitted as long-wave thermal radiation having a wavelength of 5 to 15 micrometers. While plastic glazings are generally transparent to the visible and near infrared wavelengths, they are not transparent to the long-wave thermal radiation, and the thermal radiation cannot radiate outwards of the internal space and a greenhouse effect results. In order to reduce the heat buildup in internal spaces, the amount of solar energy that penetrates the plastic glazing should be reduced. It was surprisingly discovered that an infrared blocking layer comprising a host material and a plurality of composite fibers could result in an increase in near infrared reflectance from the layer. The infrared blocking layer can block much of the light in the near infrared wavelength, while maintaining a high visible light transmittance at the same time. Furthermore, the infrared blocking layer can be transparent to thermal infrared wavelengths (for example, at 8 to 12 micrometers). In this case, heat would be allowed to escape from the interior space, allowing for increased cooling.

The infrared blocking layer comprises a host material and a plurality of composite fibers. The infrared blocking layer has two main surfaces having a length and a width; wherein a ratio between one or both of the length, l, and width, w, to a height, h, of the infrared blocking layer can be greater than or equal to 10:1 (l:h≥10:1; w:h≥10:1).

The infrared blocking layer can reflect greater than or equal to 10%, greater than or equal to 25%, greater than or equal to 50%, or greater than or equal to 75% of near infrared radiation having a wavelength of 800 to 2,000 nm. Depending on the desired use of the article, the infrared blocking layer can have a visible light transmittance of greater than 80% as determined using 3.2 mm thick samples using ASTM D-1003-00, Procedure B using CIE standard illuminant C, with unidirectional viewing. Depending on the desired use of the article, the infrared blocking layer can have a haze of less than or equal to 10%, or less than or equal to 5%, or less than or equal to 1% as measured in accordance with ASTM D1003-11, procedure A with CIE standard illuminant C (see ISO/CIE 10526).

Figure 1:
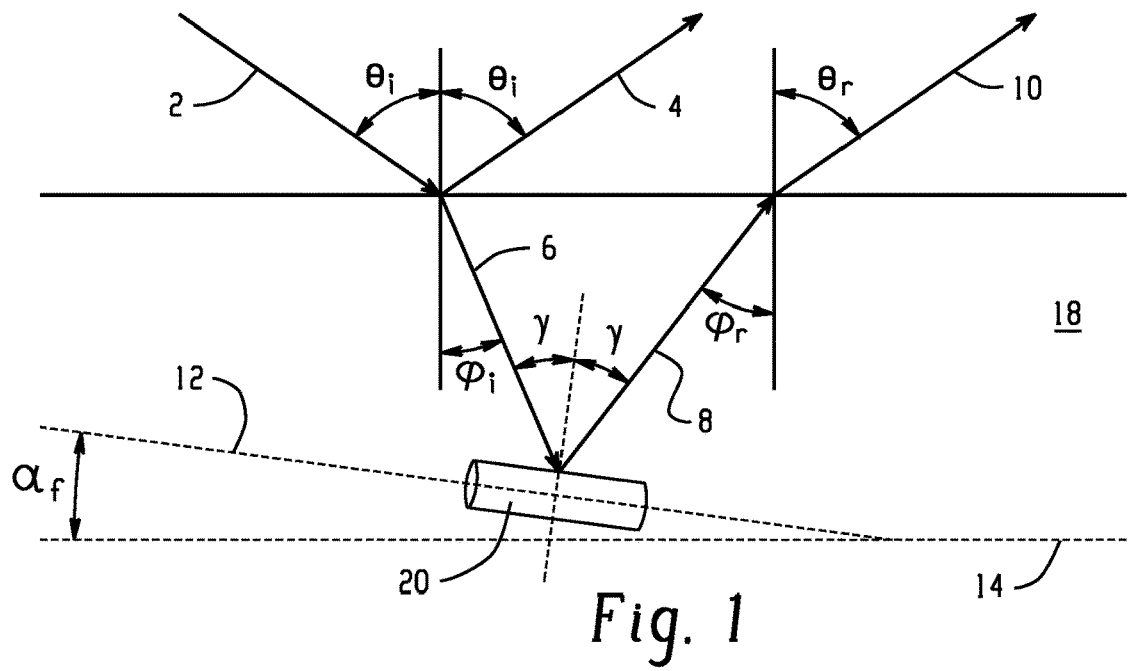
FIG. 1 is an illustration of an embodiment of light interacting with an infrared blocking layer.

FIG. 1 is an illustration of an embodiment of a ray of infrared light incident upon a main surface of the infrared blocking layer. FIG. 1 illustrates that incident ray 2 approaches a main surface of the infrared blocking layer. A portion of incident ray 2 is reflected off of the surface as surface reflected ray 4 that is dependent on polarization and angle of incidence $\theta_i$. A portion of incident ray 2 enters host material 18 as refracted ray 6 at refracted angle $\varphi_i$ to the normal of the main surface. When the host material 18 comprises, for example, polycarbonate, the relative amount of incident ray 2 that enters host material 18 can range from 0% when $\theta_i$ is equal to 90° to 95% when $\theta_i$ is normal (0°) to the surface independent of polarization of the light incident on the main surface.

As refracted ray 6 encounters composite fiber 20, fiber reflected ray 8 is directed back to the main surface and exits the infrared blocking layer as emitted ray 10 at an emitted angle, $\theta_r$. Fiber refracted angle $\gamma$ is equal to $\varphi_i$ plus $\alpha_f$, where $\alpha_f$ is the fiber angle of central fiber axis 12 to parallel line 14 that is parallel to the main surface. As the composite fibers are located in the host material 18 with a refractive index that is greater than the surrounding environment (such as air) through which the incident ray 2 is travelling, the range for the angle $\varphi_i$ of refracted ray 6 is less than the range for the angle of incidence $\theta_i$. For example, when the host material 18 comprises polycarbonate, $\varphi_i$ is less than or equal to 40°, even as $\theta_i$ reaches 90° so that $\gamma<40°+\alpha_f$. Therefore, the smaller the fiber angle $\alpha_f$ is, the smaller will be. For example, when the magnitude of $\alpha_f$ is less than 10°, then $\gamma$ can be less than 50°.

The composite fibers comprise a contrast material and a matrix material. The contrast material forms a photonic crystal in the matrix material that when exposed to an infrared radiation, manifests a photonic band gap. The plurality of composite fibers can comprise a plurality of photonic band gap fibers, a plurality of Bragg fibers, or a combination comprising at least one of the foregoing. The specific parameters of the composite fibers selected can be chosen such that they can provide a distribution of center wavelengths such that they collectively span the desired wavelength. For example, the composite fibers can be chosen to have center wavelengths across the near infrared (such as at 800 nm, 1,060 nm, 1,550 nm, and 2,000 nm). As used herein, the term center wavelength refers to the wavelength corresponding to the frequency at the center of the largest photonic band gap exhibited by the composite fiber.

The plurality of composite fibers can comprise a plurality of photonic band gap fibers. The contrast material in the photonic band gap fibers can be in the form of rods. The rods can be parallel to a central axis of the photonic band gap fibers. In each respective fiber, the rods can form a hexagonal lattice, a honeycomb lattice, a square lattice, a triangular lattice, or a Kagome lattice of the contrast material. The plurality of photonic band gap fibers can comprise a plurality of hexagonal lattice photonic band gap fibers, a plurality of honeycomb lattice photonic band gap fibers, a plurality of square lattice photonic band gap fibers, a plurality of triangular lattice photonic band gap fibers, a plurality of Kagome lattice photonic band gap fibers, or a combination comprising at least one of the foregoing. Specifically, the plurality of photonic band gap fibers can comprise a plurality of hexagonal lattice photonic band gap fibers, wherein the rods form a hexagonal lattice along a cross-section of the respective fibers.

Figure 2:
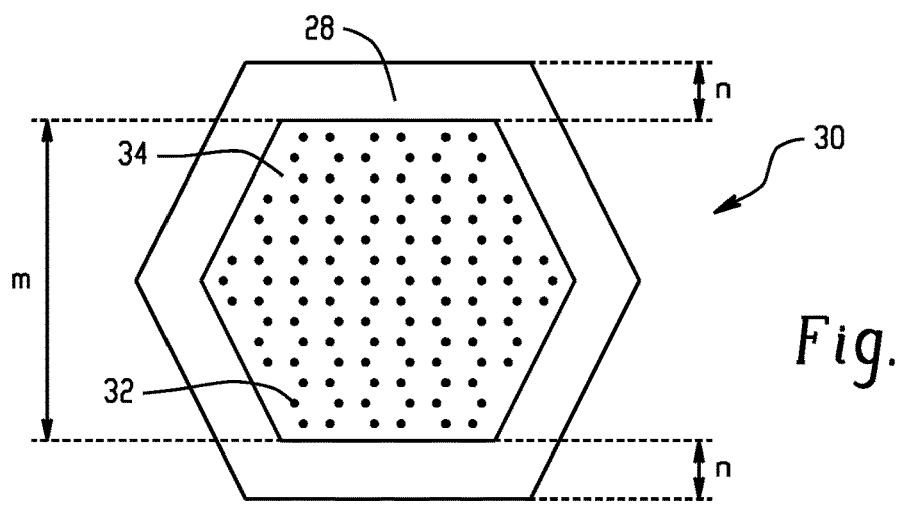
FIG. 2 is an illustration of an embodiment of a cross-section of a photonic band gap fiber.

FIG. 2 is an illustration of a cross-section of an embodiment of a honeycomb lattice photonic band gap fiber 30. Honeycomb lattice photonic band gap fiber 30 comprises a plurality of rods 32 having a circular cross-section arranged in a honeycomb lattice in matrix material 34.

Each rod individually can have a rod diameter of 5 to 50 micrometers. Each rod individually can have a rod length that is within 5%, within 1%, or within 0.1% of a length of the composite fiber that it is located in. A cross-section of the rods perpendicular to the central axis can be circular, ovoid, hexagonal, pentagonal, rectangular, triangular, irregular, and the like, or a combination comprising at least one of the foregoing.

The plurality of composite fibers can comprise a plurality of Bragg fibers. The Bragg fibers have a 1-D photonic crystal arrangement of concentric rings of the contrast material concentrically located around an inner fiber core. The inner fiber core can comprise the matrix material. The plurality of composite fibers can be free of a central gas channel. The 1-D photonic crystal arrangement can comprise alternating rings of the contrast material and the matrix material. Each of the concentric rings of the contrast material independently can have a ring thickness, d, and an average periodicity, p, wherein d/p is less than 1 or less than or equal to 0.3. As used herein, periodicity is the difference, p, between the inner radius of a first contrast ring and the inner radius of a subsequent contrast ring; see for example FIG. 3. Each ring independently can have a ring length along the central axis of the composite fiber that is within 5%, within 1%, or within 0.1% of a length of the composite fiber that it is located in.

Figure 3:
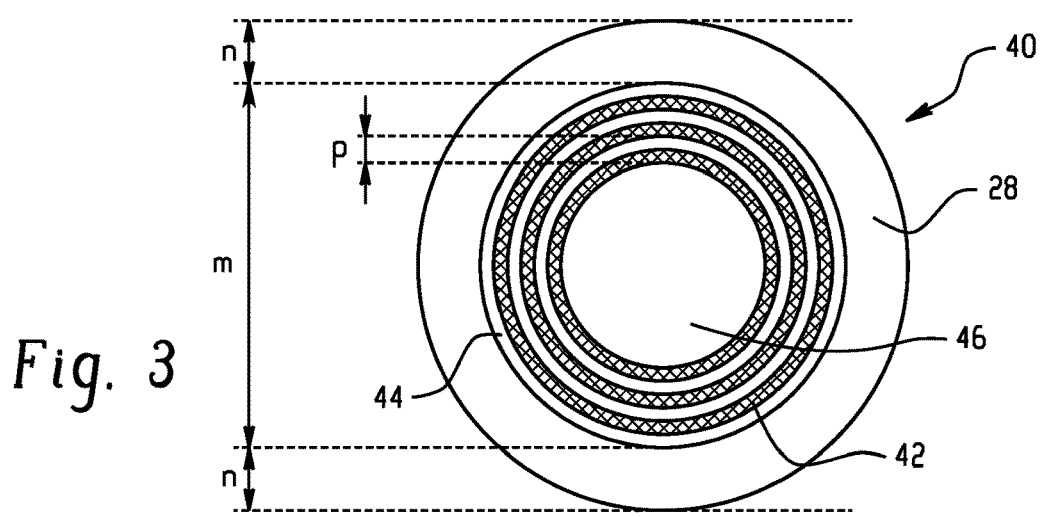
FIG. 3 is an illustration of an embodiment of a cross-section of a Bragg fiber.

FIG. 3 is an illustration of a cross-section of an embodiment of Bragg fiber 40. Bragg fiber 40 comprises a plurality of concentric rings of the contrast material 42 and a plurality of concentric rings of the matrix material 44 located around fiber core 46.

The composite fibers can comprise at least one of a plurality of composite fiber strands and a plurality of short length composite fibers. The plurality of short length composite fibers can have an average composite fiber length of 2 to 10 mm. The plurality of composite fiber strands can have an average strand length of greater than 10 mm, or greater than 10 mm to the length of the of the article, for example, if the pre-formed composite fiber strands are extruded with the host material. The plurality of composite fibers can have an average shortest dimension, m, of 50 to 1,000 micrometers, or 80 to 1,000 micrometers, not including any cladding. Examples of a shortest dimension of a hexagonal fiber and a cylindrical fiber are illustrated in FIG.

2 and FIG. 3, respectively. The plurality of composite fibers can comprise fibers having the same or different cross-sections. Examples of cross-sections include circular, ovoid, hexagonal, pentagonal, rectangular, triangular, irregular, and the like.

The plurality of composite fibers can be formed by cleaving fibers of a desired length from a longer strand. Therefore the ends of the composite fibers can be blunt ends that are not tapered. The blunt ends of the composite fibers can result in a decreased scattering of visible light by the infrared blocking layer as compared to an infrared blocking layer comprising fibers with tapered ends.

All of or a portion of the plurality of composite fibers can comprise a fiber cladding located on an external surface of the respective composite fibers. For example, 0 to 100%, or 80 to 100% of the plurality of composite fibers can comprise a fiber cladding. The fiber cladding can improve the miscibility of the composite fibers with the host material. The fiber cladding can be added during or after fiber formation. The fiber cladding can have a thickness of 0.1 to 3 mm. Examples of fibers comprising fiber cladding 28 having a thickness n are illustrated in FIG. 2 and FIG. 3.

The matrix material, the contrast material, the optional fiber cladding, and the host material can be selected such that the infrared blocking layer can reflect greater than or equal to 10%, greater than or equal to 25%, greater than or equal to 50%, or greater than or equal to 75% of near infrared radiation having a wavelength of 800 to 2,000 nm.

The contrast material has a contrast material refractive index, $n_o$, and the matrix material has a matrix material refractive index, $n_m$; and the contrast material refractive index can be greater than the matrix material refractive index. For example, the contrast material refractive index can be greater than, or greater than or equal to 1.2 times, or greater than or equal to 2 times, or 1.2 to 5 times the matrix material refractive index ($n_o \geq 1.2 n_m$). Conversely, the contrast material refractive index can be less than the matrix material refractive index. The contrast material refractive index can be within 25% or within 1% of the matrix material refractive index. The host material has a host refractive index, $n_h$, and the matrix material refractive index can be within 10%, or within 5%, or within 1% of the host refractive index. If present, a cladding refractive index, $n_l$, of the cladding material of the fiber cladding can be within 10%, or within 5%, or within 1% of the matrix material refractive index. As used herein, the refractive index values are in the visible wavelength range.

The contrast material can comprise a fluoropolymer. The fluoropolymer can comprise a fluorinated polypropylene. The fluoropolymer can comprise poly(vinylidene fluoride) (PVDF), polyethylenetetrafluoroethylene, polychlorotrifluoroethylene, polyhexafluoropropylene, polyethylenechlorotrifluoroethylene, polyperfluoro(methyl vinyl)ether, polyperfluoro(alkyl vinyl)ether (such as polyperfluoro(propyl vinyl)ether), polyvinylfluoride, perfluoroelastomer, poly(chlorotrifluoroethylene vinylidene fluoride), perfluoropolyether, poly(perfluorosulfonic acid), perfluoropolyoxetane, or a combination comprising one or more of the foregoing. The fluoropolymer can comprise polyvinylidene fluoride.

The contrast material can comprise a glass, such as a chalcogenide glass. One or both of the contrast material and the matrix material can comprise a glass. The presence of the glass in the composite fiber can result in less physical damage of the fiber lattice or of the photonic crystal during processing of the article. This reduction in physical damage can result in an improved article as any uncontrolled change in the lattice parameters or in the photonic crystal can result in an increase in scattering.

The contrast material can comprise a thermo-refractive material such that an increased reflection of near infrared light occurs with increasing ambient temperature. In this case, with decreasing temperature, the photonic band gap shift can be to longer wavelengths away from the visible light wavelengths, allowing the article to transmit more of the energy at the near infrared wavelengths that are close to the visible wavelengths. Such a thermo-refractive material would allow for the infrared blocking layer to transmit more solar energy in colder climates resulting in a reduced heater load for the vehicle and increased occupant comfort. The increased transmission of the solar energy would be particularly useful for electric vehicles, which lack sufficient waste heat (from the propulsion motor) to heat the passenger cabin in cold climate. The temperature-modulated infrared reflection can be accomplished without affecting visible light transmittance. The thermo-refractive material can comprise a liquid crystal such as one that exhibits the desired shift, for example, over the temperature range of 30 to 70° C.

The composite fibers comprising a thermo-refractive material can be formed by first forming a long fiber; cleaving the long fiber into a plurality of short fibers; and infusing the fibers with the thermo-refractive material to form the plurality of composite fibers. The composite fibers comprising a thermo-refractive material can be formed by infusing hollow tubes with the thermo-refractive material in a preform; thermally drawing a long fiber; and cleaving the long fiber to form the plurality of composite fibers. In either method of forming the composite fibers, the blunt ends can be sealed after cleaving.

The contrast material can comprise a gas, for example, air. The contrast material can comprise a fluoropolymer such as poly(vinylidene fluoride) and the matrix material can comprise a polycarbonate.

The matrix material can comprise a thermoplastic polymer or a glass. The host material can comprise a thermoplastic polymer. The fiber cladding can comprise a thermoplastic polymer. The matrix material, the host material, and the fiber cladding, if present, can comprise the same or different thermoplastic polymer.

The thermoplastic polymer can comprise a polycarbonate (such as a bisphenol A polycarbonate), a polyester (such as polyethylene terephthalate), a polyacetal, a polyacrylic, a polystyrene, a polyamide, a polyimide, a polyarylate, a polysulfone, a polyether, a polyphenylene sulfide, a polyvinyl chloride, a polytetrafluoroethylene, a polyetherketone, a polyether etherketone, a polyether ketone ketone, a polyacetal, a polyanhydride, a polyvinyl alcohol, a polyvinyl ketone, a polyvinyl halide, a polyvinyl nitrile, a polyvinyl ester, a polysulfonate, a polysulfide, a polythioester, a polyurea, a polyphosphazene, a polysilazane, polyvinyl butyral, or a combination comprising at least one of the foregoing. The thermoplastic polymer can comprise a polycarbonate, a polyester, a polyether sulfone, a polyether imide, or a combination comprising at least one of the foregoing. The thermoplastic polymer can comprise a polycarbonate.

In specific examples, the host material can comprise a polycarbonate, a polyester, a polyether sulfone, a polyether imide, an acrylonitrile-butadiene-styrene polymer, or a combination comprising at least one of the foregoing. The fiber cladding can comprise a polycarbonate, a polyester, an acrylonitrile-butadiene-styrene (ABS) polymer, or a combination comprising at least one of the foregoing. One or both of the host material and the fiber cladding can comprise a polycarbonate-ABS copolymer. One or both of the host material and the fiber cladding can comprise a polycarbonate-poly(butylene terephthalate) copolymer. The fiber cladding can comprise a cladding polymer and the host material can comprise a host polymer; and the cladding polymer and the host polymer can be the same. The host material can comprise a host polymer and the matrix material can comprise a matrix polymer; and the host polymer and the matrix polymer can be the same.

If the plurality of composite fibers comprises Bragg fibers, the inner fiber core and the host material can each independently comprise a thermoplastic polymer such as polycarbonate, and the rings of the contrast material can comprise a fluorinated polymer, specifically, polyvinylidene fluoride.

The plurality of composite fibers can be randomly oriented throughout the infrared blocking layer. The plurality of composite fibers can be non-randomly oriented relative to the main surface of the infrared blocking layer. For example, the plurality of composite fibers can have an average fiber angle, $\alpha_f$, of the plurality of composite fibers in the cap layer of 0 to 10°, or 0 to 20° relative to a main surface. As used herein, fiber angles are determined based on the relative angle of the central fiber axis relative to one of the main surfaces, for example, as illustrated in FIG. 1.

Figure 4:
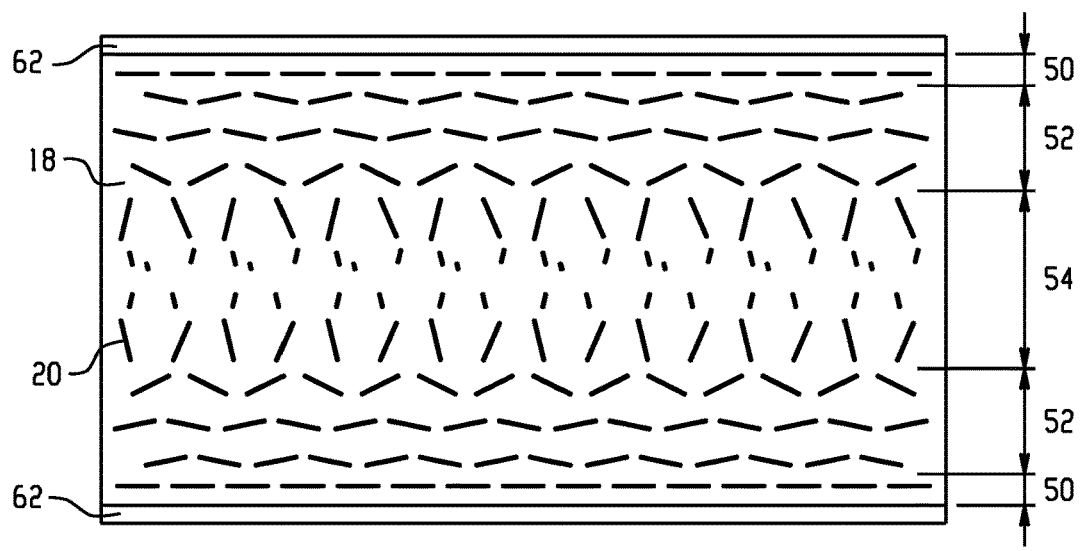
FIG. 4 is an illustration of an embodiment of an infrared blocking layer comprising regions of varying fiber orientation.
Figure 5:
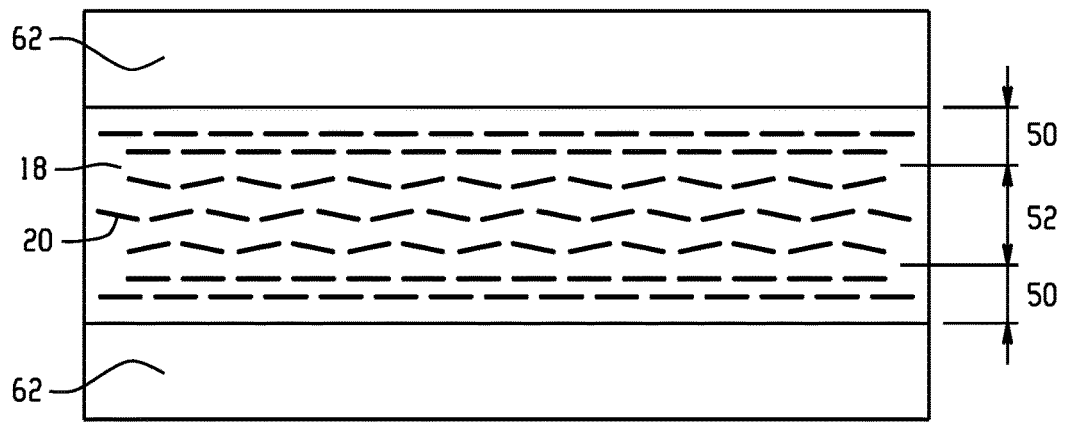
FIG. 5 is an illustration of an embodiment of an infrared blocking layer comprising two external fiber-free regions.

The infrared blocking layer can comprise regions wherein the relative average angle of the composite fibers varies. For example, the article can comprise a skin region adjacent to at least one of the main surfaces, a shell region adjacent to the skin region and in between the skin region and an optional core region. FIG. 4 illustrates that the infrared blocking layer can comprise skin region 50, shell region 52, core region 54, and fiber-free region 62. FIG. 5 illustrates that the infrared blocking layer can comprise skin region 50 and shell region 52. An average fiber angle in the skin region, herein referred to as an average skin angle, $\alpha_k$, can be 0 to 20°, or 0 to 10° relative to a main surface. An average fiber angle in the shell region, herein referred to as an average shell angle, $\alpha_h$, can be 10 to 40° or 20 to 30° relative to a main surface. An average fiber angle in the core region, herein referred to as an average core angle, $\alpha_c$, can be 30 to 90° or 40 to 90° relative to a main surface. The average core angle can be greater than the average shell angle. The average shell angle can be greater than the average skin angle.

Figure 6:
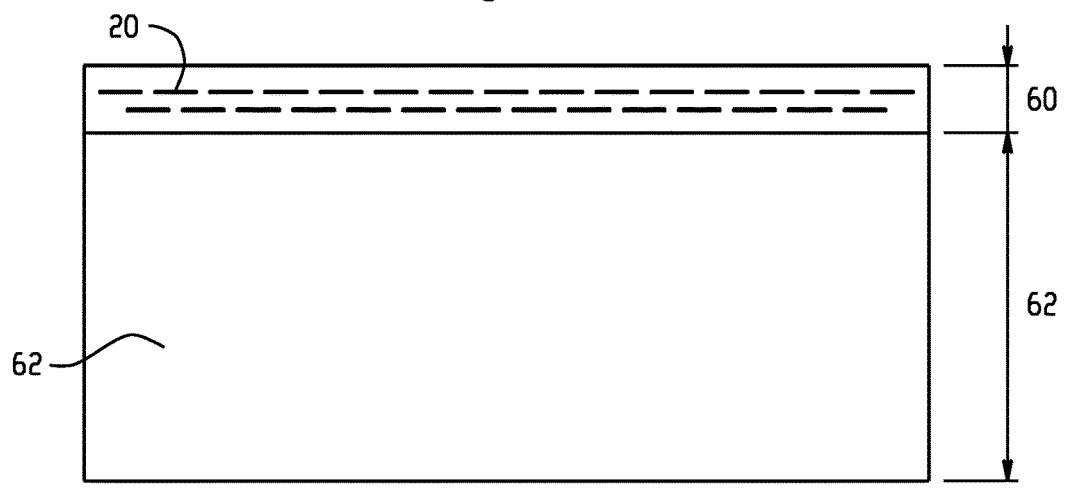
FIG. 6 is an illustration of an embodiment of an infrared blocking layer comprising a fiber cap layer.

The infrared blocking layer can comprise a fiber-free region. The fiber-free region can be a discrete fiber-free layer. The fiber-free region can be located on one or both of the main surfaces of the fiber region. As used herein, the fiber region refers to the part of the infrared blocking layer that comprises the composite fibers. For example, FIG. 5 illustrates fiber-free regions 62 located on the main surfaces of an internal fiber region and FIG. 6 illustrates an infrared blocking layer comprising fiber-free region 62 and fiber cap layer 60, which is an example of a fiber region. It is noted that a second fiber cap layer could be located on the other main surface of the infrared blocking layer of FIG. 6. Further, the fiber cap layer can be a discreet layer from the fiber-free region. The plurality of composite fibers in the fiber cap layer can have an average skin angle, $\alpha_k$, of 0 to 20°, or 0 to 10° relative to a main surface. The infrared blocking layer of FIG. 6 can result in a reduction of haze formation if the composite fibers selected would scatter the visible light that is refracted into the infrared blocking layer if the composite fibers were present where they could have a larger average angle than in the fiber cap layer.

The fiber-free region can comprise a planarization layer, an ultraviolet absorbance layer, an abrasion resistant layer, or a combination comprising at least one of the foregoing. Surface roughness can occur on a main surface of the infrared blocking layer due to the blunt ends of the fibers sticking out and can be rough if the composite fibers comprise glass. The planarization layer can therefore be added to improve homogeneity of and to reduce the surface roughness of the infrared blocking layer by covering the exposed fiber ends. The planarization layer can have a surface roughness, Ra, of less than or equal to 5 micrometers as determined in accordance with ASME B46.1 or ISO 4287. The planarization layer can comprise a thermoplastic polymer such as polycarbonate. Conversely, the surface roughness of the infrared blocking layer can be reduced by, for example, a polishing step.

The ultraviolet absorbance layer can comprise a silicone, a polyurethane, an acrylic, a polyester, an epoxy, or a combination comprising at least one of the foregoing. The ultraviolet absorbance layer can comprise ultraviolet (UV) absorbing molecules, such as 4,6-dibenzoyl resorcinol (DBR), hydroxyphenyltriazine, hydroxybenzophenones, hydroxyphenyl benzotriazoles, hydroxyphenyltriazines, polyaroylresorcinols, 2-(3-triethoxysilylpropyl)-4,6-dibenzoylresorcinol) (SDBR), a cyanoacrylate, or a combination comprising at least one of the foregoing. Examples of UV absorbers are TINUVIN™ 329, TINUVIN™ 234, TINUVIN™ 350, TINUVIN™ 360 or UVINOL™ 3030.

The ultraviolet absorbance layer can comprise a metal oxide (such as zirconium oxide, aluminum oxide (such as $Al_2O_3$), titanium dioxide, zinc oxide, cerium oxide, iron oxide (such as $Fe_2O_3$), and the like, or a combination comprising at least one of the foregoing.

The ultraviolet absorbance layer can comprise one homogenous layer or can comprise multiple sub-layers, such as a primer layer and a topcoat layer. The primer layer can aid in adhering the topcoat to the infrared blocking layer. The primer layer, for example, can comprise an acrylic, a polyester, an epoxy, or a combination comprising at least one of the foregoing. The topcoat layer can comprise polymethylmethacrylate, polyvinylidene fluoride, silicone (such as a silicone hardcoat), polyvinylfluoride, polypropylene, polyethylene, polyurethane, polyacrylate (such as polymethacrylate), or a combination comprising at least one of the foregoing.

A variety of additives can be added to the ultraviolet absorbance layer, e.g., to either or both the primer and the topcoat, such as colorants (tints), rheological control agents, mold release agents, antioxidants, and IR absorbing or reflecting pigments, among others. The type of additive and the amount of each additive is determined by the performance required by the infrared blocking layer to meet the specification and requirements for use as a window.

The abrasion resistant layer can comprise one or both of an organic coating and an inorganic coating. The abrasion resistant layer can comprise $SiO_xC_yH_z$. The organic coating can comprise a urethane, an epoxide, an acrylate (for example, a silicone based acrylate), or a combination comprising at least one of the foregoing. The inorganic coating can comprise silicone, aluminum oxide, barium fluoride, boron nitride, hafnium oxide, lanthanum fluoride, magnesium fluoride, magnesium oxide, scandium oxide, silicon monoxide, silicon dioxide, silicon nitride, silicon oxy-nitride, silicon oxy-carbide, silicon carbide, tantalum oxide, titanium oxide, tin oxide, indium tin oxide, yttrium oxide, zinc oxide, zinc selenide, zinc sulfide, zirconium oxide, zirconium titanate, glass, or a combination comprising at least one of the foregoing.

The abrasion resistant layer can be applied by deposition from reactive reagents, such as those employed in vacuum-assisted deposition processes, and atmospheric-pressure coating processes, such as those used to apply sol-gel coatings to substrates. Examples of vacuum-assisted deposition processes include plasma enhanced chemical vapor deposition, ion assisted plasma deposition, magnetron sputtering, electron beam evaporation, and ion beam sputtering. The abrasion resistant layer can be applied by a vacuum deposition technique plasma-enhanced chemical vapor deposition (PECVD), expanding thermal plasma PECVD, plasma polymerization, photochemical vapor deposition, ion beam deposition, ion plating deposition, cathodic arc deposition, sputtering, evaporation, hollow-cathode activated deposition, magnetron activated deposition, activated reactive evaporation, thermal chemical vapor deposition, or a sol-gel coating process. Examples of atmospheric-pressure coating processes include PECVD, curtain coating, spray coating, spin coating, dip coating, and flow coating, as well as combinations comprising at least one of the foregoing. The abrasion resistant layer can be applied via any technique or combination comprising at least one of the foregoing.

A specific type of PECVD process used to deposit the abrasion resistant layers comprising an expanding thermal plasma reactor is preferred. In an expanding thermal plasma PECVD process, a plasma is generated via applying a direct-current (DC) voltage to a cathode that arcs to a corresponding anode plate in an inert gas environment. The pressure near the cathode is typically higher than 20 kPa, e.g., close to atmospheric pressure, while the pressure near the anode resembles the process pressure established in the plasma treatment chamber of 2 to 14 pascal (Pa). The near atmospheric thermal plasma then supersonically expands into the plasma treatment chamber.

The reactive reagent for the expanding thermal plasma PECVD process can comprise, for example, octamethylcyclotetrasiloxane (D4), tetramethyldisiloxane (TMDSO), hexamethyldisiloxane (HMDSO), vinyl-D4, or another volatile organosilicon compound. The organosilicon compounds are oxidized, decomposed, and polymerized in the arc plasma deposition equipment, typically in the presence of oxygen and an inert carrier gas, such as argon, to form an abrasion resistant layer.

If both the ultraviolet absorbance layer and the abrasion resistant layer are present, the ultraviolet absorbance layer can be located in between the infrared blocking layer and the abrasion resistant layer.

One or more of the layers in the article can comprise an additive to modify optical, chemical, and/or physical properties. Some possible additives include, for example, mold release agents, ultraviolet light absorbers, flattening agents, binders, stabilizers (such as thermal stabilizers, and so forth), lubricants, plasticizers, rheology control additives, dyes, pigments, colorants, dispersants, anti-static agents, blowing agents, flame retardants, impact modifiers, among others, such as transparent fillers (e.g., silica, aluminum oxide, etc.). The above additives can be used alone or in combination with one or more additives.

The infrared blocking layer can further comprise an infrared blocking particle such as indium tin oxide, antimony tin oxide, fluorine tin oxide, tungsten oxide, or a combination comprising at least one of the foregoing.

The infrared blocking layer can be formed by mixing the host material and the plurality of composite fibers to form a mixture; and forming the infrared blocking layer from the mixture. The infrared blocking layer can be formed by mixing a host polymer precursor (for example comprising one or more of monomers, oligomers, and crosslinkable polymers) and the plurality of composite fibers to form a mixture; and reacting the host polymer precursor to form the infrared blocking layer. The forming can comprise injection molding, extruding, film insert molding, in-mold coating, lamination, or a combination comprising at least one of the foregoing.

The method can comprise melting the host material to form a melted host material. The melting can occur before or after the mixing. For example, if the plurality of composite fibers comprises a fiber cladding, the mixing can comprise mixing the plurality of composite fibers with a melted host material. The fiber cladding can be only partially melted during the mixing and forming. The partial melting of the fiber cladding can enhance the mixing of the fibers into the host material, can help to maintain the integrity of the photonic crystals within the composite fibers, and can result in a decreased surface roughness as compared to the same infrared layer but comprising the same number of composite fibers without the fiber cladding. The partial melting of the fiber cladding can be achieved by adding the fiber clad composite fibers to an already molten host material, for example, just before forming the article.

The forming can comprise injection molding the mixture onto a fiber-free region such as a discrete fiber-free layer; or a layer that is free of the composite fibers can be formed onto a fiber-bearing layer, for example, by back molding the layer that is free of the composite fibers onto the fiber-bearing layer. Adding the discreet layers can be performed by using different methods such as FIM, in-mold coating, back molding, co-extrusion.

The infrared blocking layer can be formed by extruding the mixture, optionally by co-extruding with a fiber-free composition, to form a multilayer article. Following extrusion, the multilayer article can be laminated, for example, in a roll mill or a roll stack. The extruding can comprise extruding in a single or a twin screw extruder. The extruding can comprise adding the composite fibers to the host material as a masterbatch and extruding the mixture to form the infrared blocking layer.

The infrared blocking layer can be formed by forming a layered stack comprising a host layer and a fiber layer. For example, a fiber layer comprising the plurality of composite fibers can be disposed on a host layer comprising the host material that is free of the composite fibers to form a layered stack; and a polymer layer can optionally be formed on or adhered to a side of the fiber layer opposite the host layer. The composite fibers can comprise at least one of a plurality of composite fiber strands and a plurality of short length composite fibers. During the disposing, one or both of the host layer and the composite fibers can be heated, for example, to a temperature greater than or equal to the glass transition temperature of the host material. The host layer can be selectively heated to heat a fiber disposition side of the host layer, for example, using infrared radiation. The increased temperature during disposition can advantageously promote the adhesion of the fibers in the fiber layer to the host layer. The increased temperature during disposition can result in the fibers partially or completely embedding into the host material. After the disposing, the host layer and the fiber layer can be heated to partially or completely embed the fibers into the host material. The heating can comprise heating the fiber stack, for example, in an oven or selectively heating the fiber layer surface, for example, using infrared radiation directed towards the fiber layer surface.

A polymer layer can be added on top of the fiber layer of the layered stack, for example, by laminating a polymer layer to the layered stack, by film insert molding (i.e., by back filling a mold comprising the layered stack with a molten polymer), or by reaction injection molding the polymer layer onto the layered stack. The laminating can comprise stacking the polymer layer on the layered stack and applying one or both of heat and pressure such that the composite fibers become embedded in the material from at least one of the host layer and the polymer layer. The resultant infrared blocking layer can be free of entrapped air bubbles. The polymer layer can comprise the same or different material as the host material, for example, polycarbonate. The polymer layer can be free of the composite fibers prior to forming the infrared blocking layer.

The infrared blocking layer can be formed by a multilayer co-extrusion method. For example, a host layer that is free of the composite fibers, a fiber layer that comprises pre-formed composite fibers, and an optional polymer layer that is free of the composite fibers can be co-extruded to form the infrared blocking layer. As used herein, the term "pre-formed composite fibers" refers to the composite fibers being formed prior to the co-extrusion and are not being extruded themselves to form their composite fiber structure during the co-extrusion with the host material. The co-extrusion can be at a temperature above the glass transition temperature of the host material such that composite fibers partially or completely embed in one or both of the host layer and the optional polymer layer during the co-extrusion. The co-extrusion can comprise applying a pressure. Likewise, the fiber side (i.e. the side of the host layer with the extruded composite fibers) of the host layer can be heated during or after forming, for example, using infrared radiation in order to partially or completely embed the composite fibers into the host material. One or both of heat and pressure can be applied during or after co-extrusion. The composite fibers can comprise at least one of a plurality of composite fiber strands and a plurality of short length composite fibers. The polymer layer can comprise the same or different material as the host material, for example, polycarbonate. If the polymer layer is not co-extruded with the host material and the plurality of pre-formed composite fibers, then the polymer layer can be added on top of the extrudate, for example, by laminating a polymer layer to the extrudate, by film insert molding (i.e., by back filling a mold comprising the extrudate with a molten polymer), or by reaction injection molding the polymer layer onto the extrudate.

Figure 7:
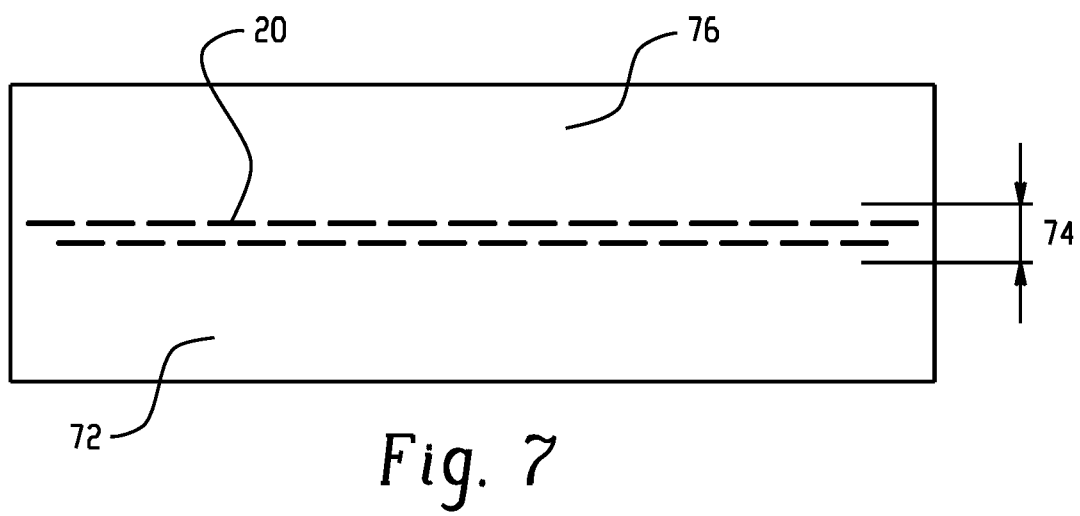
FIG. 7 is an illustration of an embodiment of an infrared blocking layer comprising a host region, a fiber region, and a polymer region.

FIG. 7 is an illustration of an embodiment of an infrared blocking layer, for example, formed from a layered stack or by co-extrusion. FIG. 7 illustrates that the infrared blocking layer can comprise host region 72, fiber region 74 comprising composite fibers 20, and optional polymer region 76. The boundaries between the regions can be discreet such that the fibers are not located above and below a certain region. For example, fiber region 74 can have an upper and a lower bound defined by the upper most height and the lower most height, respectively, where a composite fiber is located and one or both of host region 72 and optional polymer region 76 can be free of composite fibers 20. Composite fibers 20 can be embedded in a polymeric material originating from one or both of host region 72 and polymer region 76 if present. It is noted that while FIG. 7 illustrates the composite fibers 20 having a length that is less than the length of the article, the length of the composite fibers 20 could span the length of the article.

The article can be a lens or a window. The window can be a vehicle window (such as a window of a road vehicle, a rail vehicle, an air vehicle, or a water vehicle) or an architectural window (such as a window of an office building, a school, a store, a greenhouse, a residential building, and the like). The article can be a lighting structure such as a lens of a headlight or a taillight, for example, for use in a vehicle. The vehicle can be a car, a truck, a boat, a train, a bus, an aircraft, and the like. The article can be a glazing. The article can be transparent or can be translucent or can be opaque. If the article is opaque, the article can be an automotive exterior trim (such as an applique or trim around a moon roof) or can be an architectural roof tile. The article can be the infrared blocking layer.

The above article comprising an infrared blocking layer and methods of making the same are further described in the below embodiments.

Embodiment 1

An article comprising: an infrared blocking layer comprising a host material and a plurality of composite fibers; wherein each of the composite fibers of the plurality of composite fibers comprises a contrast material and a matrix material; wherein the contrast material forms a photonic crystal in the matrix material that when exposed to an infrared radiation manifests a photonic band gap.

Embodiment 2

The article of Embodiment 1, wherein the plurality of composite fibers comprises a plurality of photonic band gap fibers; wherein the contrast material in the photonic band gap fibers are rods that form a hexagonal lattice, a honeycomb lattice, a square lattice, a triangular lattice, a Kagome lattice of the contrast material, or a combination comprising at least one of the foregoing.

Embodiment 3

The article of Embodiment 2, wherein each rod individually has a rod diameter of 5 to 50 micrometers and a rod length that is within 5% of a length of the composite fiber that it is located in.

Embodiment 4

The article of any one of the preceding embodiments, wherein the plurality of composite fibers comprises a plurality of Bragg fibers having a 1-D photonic crystal arrangement of concentric rings of the contrast material concentrically located around an inner fiber core.

Embodiment 5

The article of Embodiment 4, wherein each of the concentric rings of the contrast material has a ring thickness, d, and an average periodicity, p, wherein d/p is less than or equal to 0.3.

Embodiment 6

The article of any of Embodiments 4 to 5, wherein the inner fiber core and the host material each individually comprise a polycarbonate, and wherein the rings of the contrast material comprise a fluorinated polymer, specifically, polyvinylidene fluoride.

Embodiment 7

The article of any one of the preceding embodiments, wherein the contrast material has a contrast material refractive index, $n_o$, and the matrix material has a matrix material refractive index, $n_m$; wherein $n_o \geq 1.2 n_m$.

Embodiment 8

The article of any one of the preceding embodiments, wherein the host material has a host refractive index, $n_h$, and the matrix material has a matrix material refractive index, $n_m$; wherein $n_m$ is within 10% of $n_h$.

Embodiment 9

The article of any one of the preceding embodiments, wherein the plurality of composite fibers have an average composite fiber length of 2 to 10 mm.

Embodiment 10

The article of any one of the preceding embodiments, wherein the plurality of composite fibers have an average shortest dimension of 50 to 1,000 micrometers not including any cladding.

Embodiment 11

The article of any one of the preceding embodiments, wherein the plurality of composite fibers comprises a fiber cladding located on an external surface of the composite fibers.

Embodiment 12

The article of Embodiment 11, wherein the fiber cladding comprises a thermoplastic polymer such as a polycarbonate, a polyester, an acrylonitrile-butadiene-styrene polymer, or a combination comprising at least one of the foregoing.

Embodiment 13

The article of any one of Embodiments 11 to 12, wherein the fiber cladding comprises a cladding polymer and the host material comprises a host polymer and the cladding polymer and the host polymer are the same.

Embodiment 14

The article of any one of Embodiments 11 to 13, wherein the matrix material has a matrix refractive index, $n_m$, and the fiber cladding has a cladding refractive index, $n_l$; wherein $n_l$ is within 10% of $n_m$.

Embodiment 15

The article of any one of Embodiments 11 to 14, wherein the fiber cladding has a thickness of 0.1 to 3 mm.

Embodiment 16

The article of any one of the preceding embodiments, wherein the host material comprises a thermoplastic polymer such as a polycarbonate, a polyester, an acrylonitrile-butadiene-styrene polymer, or a combination comprising at least one of the foregoing.

Embodiment 17

The article of any one of the preceding embodiments, wherein the contrast material comprises a glass, such as a chalcogenide glass or a fluoropolymer.

Embodiment 18

The article of any one of the preceding embodiments, wherein the contrast material comprises a thermo-refractive material.

Embodiment 19

The article of any one of the preceding embodiments, wherein the matrix material comprises a glass.

Embodiment 20

The article of any one of the preceding embodiments, wherein the matrix material comprises a thermoplastic polymer such as a polycarbonate, a polyester, a polyether sulfone, a polyether imide, an acrylonitrile-butadiene-styrene polymer, or a combination comprising at least one of the foregoing.

Embodiment 21

The article of any one of the preceding embodiments, wherein the matrix material, the host material, and the optional cladding material are the same.

Embodiment 22

The article of Embodiment 21, wherein the matrix material, the host material, and the optional cladding material comprise polycarbonate.

Embodiment 23

The article of any one of the preceding embodiments, wherein the infrared blocking layer has two main surfaces having a length and a width; wherein a ratio between one or both of the length, l, and width, w, to a height, h, of the infrared blocking layer is greater than or equal to 10:1 (l:h≥10:1; w:h≥10:1).

Embodiment 24

The article of Embodiment 23, further comprising a cap layer adjacent to at least one of the main surfaces and comprising the plurality of composite fibers; wherein the plurality of composite fibers in the cap layer have an average skin angle, $\alpha_k$, of 0 to 20° relative to a main surface.

Embodiment 25

The article of Embodiment 23, wherein the article comprises a skin region adjacent to at least one of the main surfaces, a shell region adjacent to the skin region and in between the skin region and an optional core region; wherein an average skin angle, $\alpha_k$, of the plurality of composite fibers in the skin region is 0 to 20° relative to a main surface; wherein an average shell angle, $\alpha_h$, of the plurality of composite fibers in the shell region is 10 to 40° relative to a main surface; and an average core angle, $\alpha_c$, of the plurality of composite fibers in the optional core region is 30 to 90° relative to a main surface.

Embodiment 26

The article of any one of Embodiments 23 to 25, wherein at least one of the main surfaces has a roughness, Ra, of less than or equal to 5 micrometers as determined in accordance with ASME B46.1 or ISO 4287.

Embodiment 27

The article of any one of the preceding embodiments, wherein the article further comprises a fiber-free region located on a surface of the infrared blocking layer.

Embodiment 28

The article of any one of the preceding embodiments, further comprising a planarization layer located on a surface of the infrared blocking layer.

Embodiment 29

The article of any one of the preceding embodiments, wherein the infrared blocking layer reflects greater than or equal to 10%, or greater than or equal to 25% of near infrared radiation having a wavelength of 800 to 2,000 nm.

Embodiment 30

The article of any one of the preceding embodiments, wherein the infrared blocking layer has a visible light transmittance of greater than 80% as determined using 3.2 mm thick samples using ASTM D1003-00, Procedure B using CIE standard illuminant C, with unidirectional viewing.

Embodiment 31

The article of any one of the preceding embodiments, wherein the infrared blocking layer has a haze of less than or equal to 10% as measured in accordance with ASTM D1003-11, procedure A with CIE standard illuminant C.

Embodiment 32

The article of any one of the preceding embodiments, wherein the article is a window or a lighting lens.

Embodiment 33

A method of making the article of any one of the preceding embodiments, comprising: 1) mixing the host material and the plurality of composite fibers to form a mixture; and forming the infrared blocking layer from the mixture; wherein the article comprises the infrared blocking layer; or 2) mixing a host polymer precursor and the plurality of composite fibers to form a mixture; and reacting the host polymer precursor to form the infrared blocking layer; wherein the article comprises the infrared blocking layer.

Embodiment 34

The method of Embodiment 33, wherein the forming comprises injection molding, extruding, film insert molding, in-mold coating, or a combination comprising at least one of the foregoing.

Embodiment 35

The method of any one of Embodiments 33 to 34, further comprising melting the host material to form a melted host material; wherein the mixing comprises mixing the plurality of composite fibers with a melted host material; wherein the plurality of composite fibers comprises a fiber cladding, wherein the method comprises only partially melting the fiber cladding during the mixing and forming.

Embodiment 36

The method of any one of Embodiments 33 to 35, wherein the forming comprises injection molding the mixture onto a substrate free of the plurality of composite fibers.

Embodiment 37

The method of any one of Embodiments 33 to 35, wherein the forming comprises back-molding a fiber-free region onto the infrared blocking layer.

Embodiment 38

The method of any one of Embodiments 33 to 35, wherein the forming comprises co-extruding the mixture with a fiber-free composition.

Embodiment 39

A method of making the article of any one Embodiments 1 to 32, comprising: forming a layered stack comprising a host layer that is free of the plurality of composite fibers, a fiber layer comprising the plurality of composite fibers, and an optional polymer layer that is free of the plurality of composite fibers; and at least partially embedding the plurality of composite fibers in at least one of the host layer and the optional polymer layer. The embedding can comprise applying at least one of a heat, an infrared radiation, and a pressure.

Embodiment 40

The method of Embodiment 39, wherein the at least partially embedding comprises at least partially embedding the plural of composite fibers into the host layer to form the layered stack; and then forming the polymer layer on a fiber side of the fiber layer opposite the host layer.

Embodiment 41

The method of Embodiment 40, wherein the forming comprises laminating, film insert molding, or reaction injection molding.

Embodiment 42

The method of any one of Embodiments 39 to 41, wherein the at least partially embedding comprising selectively heating a fiber layer surface of the layered stack, for example, via infrared radiation. The selectively heating can occur prior to forming the optional polymer layer.

Embodiment 43

A method of making the article of any one of claims 1 to 32, comprising: co-extruding a host layer that is free of the composite fibers, a fiber layer comprising the plurality of composite fibers, and an optional polymer layer that is free of the composite fibers; wherein the composite fibers are pre-formed fibers; and embedding the plurality of composite fibers in at least one of the host layer and the optional polymer layer. The embedding can comprise applying at least one of a heat, an infrared radiation, and a pressure.

Embodiment 44

The method of Embodiment 43, wherein the co-extruding comprises co-extruding the polymer layer.

Embodiment 45

The method of Embodiment 43, wherein the co-extruding comprises co-extruding the host layer and the fiber layer to form an extrudate; and forming a polymer layer on top of the extrudate, for example, by laminating, film insert molding, or reaction injection molding.

Embodiment 46

The method of any one of Embodiments 39 to 45, wherein the composite fibers comprises a plurality of composite fiber strands having an average strand length of greater than 10 mm, or greater than 10 mm to the length of the of the article.

Embodiment 47

Use of an article for reflecting infrared light; wherein the article comprises an infrared blocking layer, for example, the infrared blocking layer of any one of the preceding embodiments, comprising a host material and a plurality of composite fibers; wherein each of the fibers of the plurality of composite fibers comprises a contrast material and a matrix material; wherein the contrast material forms a photonic crystal in the matrix material that, when exposed to an infrared radiation, manifests a photonic band gap.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced items. The term "or" means "and/or" unless clearly indicated otherwise by context. Reference throughout the specification to "an embodiment", "another embodiment", "some embodiments", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments. "Optional" or "optionally" means that the subsequently described event or circumstance may or may not occur, and that the description includes instances where the event occurs and instances where it does not. The notation "±10%" means that the indicated measurement may be from an amount that is minus 10% to an amount that is plus 10% of the stated value. The term "combination" is inclusive of blends, mixtures, alloys, reaction products, and the like.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points. For example, ranges of "up to 25 wt %, or more specifically 5 to 20 wt %" is inclusive of the endpoints and all intermediate values of the ranges of "5 to 25 wt %," such as 10 to 23 wt %, etc.).

Unless defined otherwise, technical and scientific terms used herein have the same meaning as is commonly understood by one of skill in the art to which this invention belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to Applicants or others skilled in the art. Accordingly, the appended claims as filed and as they may be amended are intended to embrace all such alternatives, modifications variations, improvements, and substantial equivalents.

What is claimed is:

1. An article comprising:
   an infrared blocking layer comprising a host material and a plurality of composite fibers; wherein the plurality of composite fibers is embedded in the host material; wherein an average fiber angle of the plurality of composite fibers in a region of the infrared blocking layer is 0 to 20° relative to a main surface of the infrared blocking layer, wherein the average fiber angle is determined based on the relative angle of a central fiber axis of the composite fibers relative to one of the main surfaces;
   wherein each of the composite fibers of the plurality of composite fibers comprises a contrast material and a matrix material; wherein the contrast material forms a photonic crystal in the matrix material that when exposed to an infrared radiation manifests a photonic band gap;
   wherein the plurality of composite fibers comprises at least one of
      a plurality of photonic band gap fibers, wherein the contrast material in the photonic band gap fibers are rods that form a hexagonal lattice, a honeycomb lattice, a square lattice, a triangular lattice, a Kagome lattice of the contrast material, or a combination comprising at least one of the foregoing; or a plurality of Bragg fibers having a 1-D photonic crystal arrangement of concentric rings of the contrast material concentrically located around an inner fiber core.

2. The article of claim 1, wherein the plurality of composite fibers comprises the plurality of photonic band gap fibers.

3. The article of claim 2, wherein each rod individually has a rod diameter of 5 to 50 micrometers and a rod length that is within 5% of a length of the composite fiber that it is located in.

4. The article of claim 1, wherein the plurality of composite fibers comprises the plurality of Bragg fibers.

5. The article of claim 4, wherein the inner fiber core and the host material each individually comprise a polycarbonate, and wherein the rings of the contrast material comprise a fluorinated polymer.

6. The article of claim 1, wherein the contrast material has a contrast material refractive index, $n_o$, and the matrix material has a matrix material refractive index, $n_m$; wherein $n_o \geq 1.2 n_m$; wherein the host material has a host refractive index, $n_h$, and $n_m$ is within 10% of $n_h$.

7. The article of claim 1, wherein the plurality of composite fibers has an average composite fiber length of 2 to 10 mm; and wherein the plurality of composite fibers has an average shortest dimension of 50 to 1,000 micrometers not including any cladding.

8. The article of claim 1, wherein the plurality of composite fibers comprises a fiber cladding located on an external surface of the composite fibers, wherein the fiber cladding optionally has a thickness of 0.1 to 3 mm.

9. The article of claim 8, wherein the fiber cladding comprises a thermoplastic polymer such as a polycarbonate, a polyester, an acrylonitrile-butadiene-styrene polymer, or a combination comprising at least one of the foregoing.

10. The article of claim 1, wherein the host material comprises a thermoplastic polymer, a polyester, an acrylonitrile-butadiene-styrene polymer, or a combination comprising at least one of the foregoing; the contrast material comprises a glass, a fluoropolymer, or a thermo-refractive material; and wherein the matrix material comprises a glass or a thermoplastic polymer.

11. The article of claim 1, wherein the matrix material, the host material, and the optional cladding material are the same.

12. The article of claim 1, wherein the article further comprises a fiber-free region located on a surface of the infrared blocking layer.

13. The article of claim 1, wherein the article is a window or a lighting lens.

14. A method of making the article of claim 1, comprising:
    mixing the host material and the plurality of composite fibers to form a mixture; and
    forming the infrared blocking layer from the mixture; wherein the article comprises the infrared blocking layer.

15. The method of claim 14, wherein the forming comprises injection molding, extruding, film insert molding, in-mold coating, or a combination comprising at least one of the foregoing.

16. The method of claim 14, further comprising melting the host material to form a melted host material;
    wherein the mixing comprises mixing the plurality of composite fibers with a melted host material; wherein the plurality of composite fibers comprises a fiber cladding, wherein the method comprises only partially melting the fiber cladding during the mixing and forming.

17. A method of making the article of claim 1, comprising:
    forming a layered stack comprising a host layer that is free of the plurality of composite fibers, a fiber layer comprising the plurality of composite fibers, and an optional polymer layer that is free of the plurality of composite fibers; and
    embedding the plurality of composite fibers in the host layer and optionally in the optional polymer layer.

18. The method of claim 17, wherein the forming comprises laminating, film insert molding, or reaction injection molding.

19. A method of making the article of claim 1, comprising:
    co-extruding a host layer that is free of the composite fibers, a fiber layer comprising the plurality of composite fibers, and an optional polymer layer that is free of the composite fibers; wherein the composite fibers are pre-formed fibers; and
    embedding the plurality of composite fibers in at least one of the host layer and the optional polymer layer.

* * * * *